Patented Nov. 17, 1942

2,301,969

UNITED STATES PATENT OFFICE 2,301,969

MONOAMIDES OF POLYCARBOXYLIC ACIDS

Walter Pinkernelle, Krefeld - Uerdingen, Germany; vested in the Alien Property Custodian No Drawing. Application April 9, 1940, Serial No. 328,695. In Germany October 31, 1936

9 Claims. (Cl. 260—534)

This invention relates to valuable compounds of organic polycarboxylic acids and a process for the manufacture of the same.

An object of the invention consists in reacting anhydrides of polycarboxylic acids two carboxylic acids groups of which are connected with adjacent carbon atoms with such tertiary amino compounds as contain in addition to the tertiary amino group also a primary or secondary amino group, the reaction being performed under such conditions that a polycarboxylic acid is formed in which one reactive group of the tertiary amino compound forms with one carboxylic acid group a monoamide and in which at least one other carboxylic acid group remains unchanged.

Among the indicated acid anhydrides are suitable for the purpose of this invention, for example aliphatic polycarboxylic acid anhydrides, such as succinic acid anhydride, maleic acid anhydride, itaconic acid anhydride, citraconic acid anhydride, aconitic acid anhydride, aromatic polycarboxylic acid anhydrides, such as phthalic anhydride, substituted phthalic anhydrides, such as halogenated phthalic anhydrides, for example chloro-, bromo- or jodo-phthalic anhydride, alkylated phthalic anhydrides, such as methyl, ethyl, propyl and butyl phthalic anhydride, nitrophthalic anhydride, hemimellitic acid anhydride and trimellitic acid anhydride and likewise the polymeric polycarboxylic acid anhydrides obtainable by mixed polymerisation of maleic acid anhydride with unsaturated compounds, such as acrylic acid esters, vinyl halogenides, vinyl esters, vinyl ethers, styrol and others. Especially suitable for the purpose of this invention are succinic acid anhydrides substituted by a hydrocarbon radicle of at least 5 carbon atoms, such as succinic acid anhydrides substituted by a saturated hydrocarbon radicle of the kind specified, for example the anhydrides of amyl succinic acid, hexyl succinic acid, heptyl succinic acid, octyl succinic acid, dodecyl succinic acid and pentadecyl succinic acid, these anhydrides being obtainable for example in accordance with the copending application Ser. No. 733,126, filed June 29, 1934, now matured into U. S. Patent 2,121,183, by condensing hydrocarbons of the paraffine series, such as pentane, hexane, heptane, octane, dodecane, pentadecane with maleic acid anhydride, furthermore succinic acid anhydrides substituted by an unsaturated alkyl radicle of at least 5 carbon atoms, such as the anhydrides of amylene succinic acid, dodecenyl succinic acid and pentadecenyl succinic acid, the anhydrides being obtainable for example by condensing the corresponding olefines, such as amylene, nonylene, dodecylene and pentadecylene with maleic acid anhydride. Finally are especially to be mentioned succinic acid anhydrides, substituted by an aralkyl radicle, such as $\gamma$-methyl-$\gamma$-phenyl-pyrotartaric acid anhydride and $\gamma$-phenyl-$\gamma\gamma$-dimethyl-pyrotartaric acid anhydride, these anhydrides being obtainable for example by the process of the said U. S. Patent 2,121,183 by condensing aliphatic hydrocarbons substituted by an aromatic radicle, such as toluene, ethyl benzene, diethyl benzene, propyl benzene and isopropyl benzene with maleic acid anhydride.

As tertiary amino compounds of the specified type are to be employed for the purpose of this invention among others amines carrying a tertiary amino group besides an amide-forming amino group, such as a primary or secondary amino group, for example N,N-dimethyl ethylene diamine, N,N-dimethyl propylene diamine, N, N-methylethyl ethylene diamine, N,N-diisopropyl putrescine, N,N-diethyl-N'-methyl ethylene diamine, N-$\beta$-aminoethyl piperidine, N,N,N'-triethyl cadaverine.

Among the mentioned starting materials, as well the acid anhydrides as also the amino compounds, those substances are particularly valuable for the process of this invention which contain open carbon chains with at least 5 carbon atoms.

For the manufacture of the reaction products the specified di- or polycarboxylic acid anhydrides are brought into reaction with the specified tertiary amino compounds advantageously in molar quantity proportions.

As a rule the components react immediately on bringing together with the evolution of heat. In some cases however it is necessary to heat the mixture of the polycarboxylic acid and the tertiary amino compound in order to obtain a reaction, it being in general sufficient for this purpose to employ a temperature from about 60° C. to about 100° C. It is to be understood that in order to obtain the result desired, the reaction is to be carried out in such a manner that no water is split off and that the reaction product becomes soluble in water, which may be easily stated by a simple test.

The specified reaction products and especially those of which one of the compounds employed for the reaction consists of a succinic acid anhydride of which one methylene group contains as substituent a radicle containing at least 5 carbon atoms are suitable as capillary active agents and soap substitutes, in particular as wetting, washing and emulsifying agents. For this purpose both the internal ammonium salts and also the alkali salts, such as the sodium salts and the potassium salts being obtainable by neutralising the free carboxylic acid group of the reaction product by means of sodium or potassium hydroxide can be employed. For example a piece of cotton is wetted in about 12 seconds by one per mille aqueous solution of a reaction product obtainable according to the following Example 2. The capillary active agents can be used both alone and also in solution or in admixtures with other substances, i. e. substances giving off oxygen or other capillary active neutral or alkaline reacting substances, such as sodium carbonate in the manner known per se.

The following examples illustrate the invention without being restricted thereto; the parts are by weight:

*Example 1*

224 parts of isononenyl succinic acid anhydride are mixed under stirring with 102 parts of N-N-dimethyl propylene diamine (1,3); the temperature thereby rises to about 140° C. The immediately formed reaction product, an internal salt, is a yellow tough oil, easily soluble in all organic solvents, dilute lyes and dilute acids.

*Example 2*

35 parts of isooctadecenyl succinic acid anhydride are mixed under stirring with 13.5 parts of N-methyl-N'N'-diethyl ethylene diamine; the temperature thereby rises to about 65° C. The immediately formed reaction product, an internal salt, is a dark brown resin, easily soluble in all organic solvents, water, dilute acids and dilute lyes.

*Example 3*

308 parts of isopentadecenyl succinic acid anhydride are mixed under stirring with 116 parts of N,N-diethyl ethylene diamine; the temperature thereby rises to about 95° C. The reaction product formed, an internal salt, is a yellow tough oil, easily soluble in all organic solvents, dilute lyes and dilute acids.

This application is a continuation in part of my application Ser. No. 169,795, filed October 19, 1937, now Patent No. 2,246,264, issued June 17, 1941.

I claim:

1. A monoamide of a polycarboxylic acid having at least two carboxylic acid groups connected with two adjacent carbon atoms and an amine carrying a tertiary amino group besides an amide-forming amino group.

2. A monoamide of an aromatic dicarboxylic acid, the two carboxylic acid groups of which are connected with two adjacent carbon atoms and an amine carrying a tertiary amino group besides an amide-forming group.

3. A monoamide of an aliphatic dicarboxylic acid, the two carboxylic acid groups of which are connected with two adjacent carbon atoms and an amine carrying a tertiary amino group besides an amide-forming group.

4. A monoamide of a succinic acid substituted by a hydrocarbon radicle of at least 5 carbon atoms and an amine carrying a tertiary amino group besides an amide-forming amino group.

5. A monoamide of a succinic acid substituted by an unsaturated alkyl radicle of at least 5 carbon atoms and an amine carrying a tertiary amino group besides an amide-forming amino group.

6. A monoamide of a succinic acid substituted by an unsaturated alkyl radicle of at least 5 carbon atoms and an amine carrying a tertiary amino group besides a primary amino group.

7. A monoamide of a succinic acid substituted by an unsaturated alkyl radicle of at least 5 carbon atoms and an amine carrying a tertiary amino group besides a secondary amino group.

8. A monoamide of isooctadecenyl succinic acid anhydride and N-methyl-N'N'-diethyl ethylene diamine.

9. A monoamide of isopentadecenyl succinic acid anhydride and N,N-diethyl ethylene diamine.

WALTER PINKERNELLE.